US012656700B2

(12) United States Patent
Sano

(10) Patent No.: US 12,656,700 B2
(45) Date of Patent: Jun. 16, 2026

(54) TONER, TONER CARTRIDGE, AND IMAGE-FORMING DEVICE

(71) Applicant: Mitsubishi Chemical Corporation, Tokyo (JP)

(72) Inventor: Shiho Sano, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 743 days.

(21) Appl. No.: 17/953,655

(22) Filed: Sep. 27, 2022

(65) Prior Publication Data

US 2023/0033896 A1 Feb. 2, 2023

Related U.S. Application Data

(63) Continuation of application No. PCT/JP2021/013877, filed on Mar. 31, 2021.

(30) Foreign Application Priority Data

Mar. 31, 2020 (JP) ................................ 2020-064013

(51) Int. Cl.
*G03G 9/087* (2006.01)
*G03G 9/08* (2006.01)
*G03G 9/09* (2006.01)

(52) U.S. Cl.
CPC ....... *G03G 9/08711* (2013.01); *G03G 9/0819* (2013.01); *G03G 9/0821* (2013.01); *G03G 9/08782* (2013.01); *G03G 9/0906* (2013.01)

(58) Field of Classification Search
CPC .. G03G 9/093; G03G 9/08711; G03G 9/0819; G03G 9/08782
See application file for complete search history.

(56) References Cited

U.S. PATENT DOCUMENTS

| | | | | |
|---|---|---|---|---|
| 7,745,085 | B2 | 6/2010 | Ishiyama et al. | |
| 9,678,450 | B2 | 6/2017 | Kumai et al. | |
| 9,766,563 | B2 | 9/2017 | Kouyama et al. | |
| 9,946,180 | B2 | 4/2018 | Kadonome et al. | |
| 10,126,668 | B2 | 11/2018 | Sugama et al. | |
| 10,437,165 | B2 | 10/2019 | Shimano et al. | |
| 10,684,567 | B2 | 6/2020 | Sugawara et al. | |
| 2008/0025754 | A1 | 1/2008 | Shiyama et al. | |
| 2011/0287353 | A1* | 11/2011 | Horiuchi et al. | G03G 5/047 |
| 2014/0272696 | A1 | 9/2014 | Yamashita et al. | |
| 2014/0363184 | A1 | 12/2014 | Santo et al. | |
| 2016/0011532 | A1 | 1/2016 | Kouyama et al. | |
| 2016/0070191 | A1 | 3/2016 | Kumai et al. | |
| 2017/0184990 | A1 | 6/2017 | Utsui et al. | |
| 2017/0307991 | A1 | 10/2017 | Kadonome et al. | |
| 2018/0081288 | A1 | 3/2018 | Sugama et al. | |
| 2018/0143550 | A1 | 5/2018 | Sugawara et al. | |
| 2018/0164708 | A1 | 6/2018 | Utsui et al. | |
| 2019/0137901 | A1 | 5/2019 | Shimano et al. | |
| 2019/0339630 | A1* | 11/2019 | Kameya et al. | G03G 9/093 |

FOREIGN PATENT DOCUMENTS

| | | | |
|---|---|---|---|
| JP | 2007-058138 | A | 3/2007 |
| JP | 2008-033057 | A | 2/2008 |
| JP | 2010-044120 | A | 2/2010 |
| JP | 2011-164333 | A | 8/2011 |
| JP | 2012-022331 | A | 2/2012 |
| JP | 2014-026257 | A | 2/2014 |
| JP | 2014-160194 | A | 9/2014 |
| JP | 2014-174501 | A | 9/2014 |
| JP | 2014-178473 | A | 9/2014 |
| JP | 2014-178648 | A | 9/2014 |
| JP | 2014-224980 | A | 12/2014 |
| JP | 2014-235400 | A | 12/2014 |
| JP | 2015-028616 | A | 2/2015 |
| JP | 2015-172646 | A | 10/2015 |
| JP | 2015-184574 | A | 10/2015 |
| JP | 2016-004229 | A | 1/2016 |
| JP | 2016-020966 | A | 2/2016 |
| JP | 2016-053677 | A | 4/2016 |
| JP | 2017-146570 | A | 8/2017 |
| JP | 2017-194606 | A | 10/2017 |
| JP | 2018-049168 | A | 3/2018 |
| JP | 2018-084606 | A | 5/2018 |
| JP | 2018-156074 | A | 10/2018 |
| JP | 2019-086642 | A | 6/2019 |
| JP | 2019-120882 | A | 7/2019 |
| JP | 2020-106748 | A | 7/2020 |
| JP | 2020-187270 | A | 11/2020 |
| WO | 2015/170705 | A1 | 11/2015 |

OTHER PUBLICATIONS

International Search Report issued in related International Patent Application No. PCT/JP2021/013877 dated Jun. 22, 2021.
Office Action issued in corresponding Japanese Patent Application No. 2022-512632, dated Aug. 26, 2025.
Office Action issued in corresponding Chinese Patent Application No. 202180023780.X, dated Mar. 25, 2026.

* cited by examiner

*Primary Examiner* — Peter L Vajda
*Assistant Examiner* — Grant Steven Seiler
(74) *Attorney, Agent, or Firm* — Morgan, Lewis & Bockius LLP

(57) ABSTRACT

A toner including particles containing a binder resin, a colorant, and wax, the toner having, in differential scanning calorimetry (DSC) performing a temperature program including steps of heating from 40° C. to 100° C. or more at a heating rate of 10° C./min (first heating), then cooling to 40° C. or less at a cooling rate of 10° C./min (first cooling), and then heating to 100° C. or more at a heating rate of 10° C./min (second heating), a total endothermic amount HA1 in the first heating from 40° C. to 100° C. and a total endothermic amount HA2 in the second heating from 40° C. to 100° C. that satisfy the following relationship (1), and a difference between a full width at half maximum of an endothermic peak in the second heating and a full width at half maximum of an exothermic peak in the first cooling of 7.00° C. or less: (1) HA2/HA1>0.80.

20 Claims, 1 Drawing Sheet

[FIG. 1]
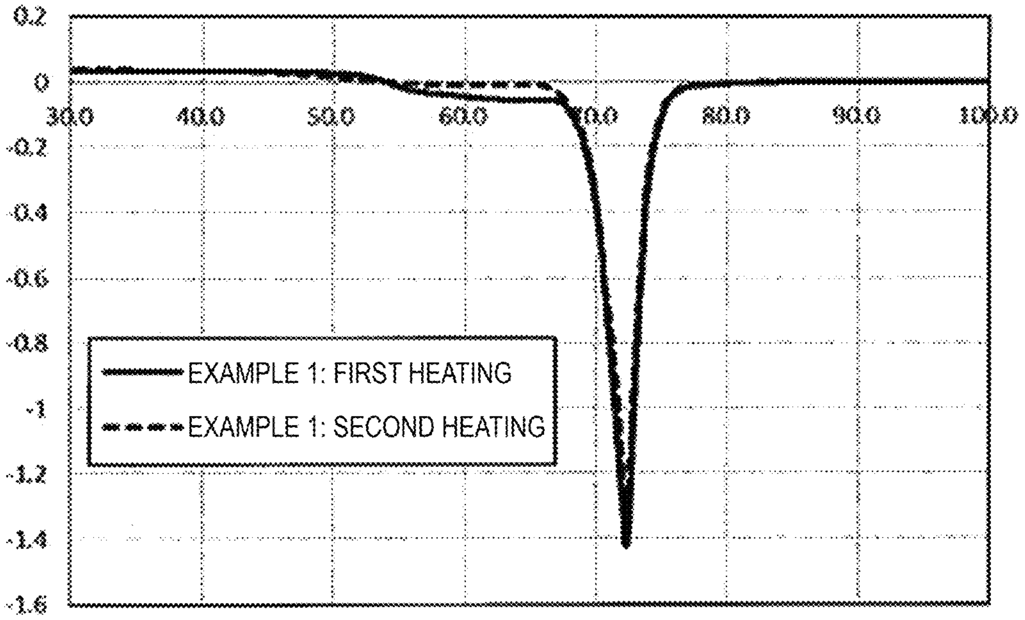
[FIG. 2]
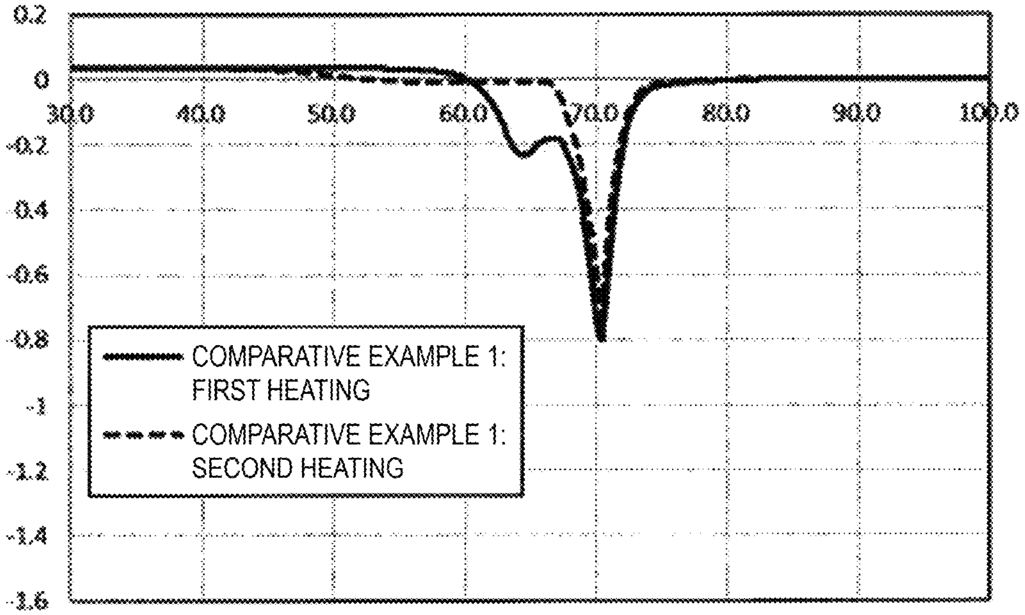

TONER, TONER CARTRIDGE, AND IMAGE-FORMING DEVICE

TECHNICAL FIELD

The present invention relates to a toner that has low temperature fixability and storage stability and can be used, for example, for development of an electrostatic image.

BACKGROUND ART

A toner for developing an electrostatic image has been used for image formation through visualization of an electrostatic image in image formation devices, such as a printer, a duplicator, and a facsimile. In the formation of an image by the electrophotographic system as an example, an electrostatic latent image is first formed on a photoreceptor drum. Subsequently, the electrostatic latent image is developed with a toner, and then transferred to transfer paper or the like, and the toner is fixed by heating, so as to complete the image formation.

The toner for developing an electrostatic image generally has a configuration including toner base particles containing a binder resin, a colorant, wax, and the like, having solid fine particles, such as silica, attached to the surface thereof as an external additive.

As for the production method of the toner of this type, the toner has been produced by a pulverization method, in which a massive material produced by kneading raw materials, such as a binder resin and a colorant, is pulverized to produce fine particles. However, there has been an increasing demand of uniformity in size of the particles for forming images with high quality, and according to the demand, the toner particles are currently being produced mainly by a polymerization method, in which a polymer is synthesized from a monomer. In this case, examples of the known polymerization method of the polymer include a suspension polymerization method, an emulsion aggregation method, and a dissolution suspension method.

In the formation of images on paper as described above, the heat for heating the toner for fixing the toner occupies most of the electric power consumption of the device, such as a duplicator. Therefore, the toner is demanded to have a property capable of being fixed at a lower temperature (low temperature fixability).

As a method for enhancing the low temperature fixability of the toner, it can be considered that the toner is produced, for example, with a binder resin having a low melting point or a low melt viscosity. However, in the case where the binder resin used in the toner is soft, the heat resistance is lowered to lower the storage stability. Therefore, the low temperature fixability and the storage stability are difficult to achieve simultaneously.

For example, PTL 1 describes, as a toner that has small fixing temperature dependency of the fixability and is excellent in thermal storage property, a toner for developing an electrostatic image, containing a crystalline polyester resin and a release agent, in which a structure including the crystalline polyester resin in contact with the release agent exists therein.

PTL 2 proposes, as a toner that has heat resistant storage stability and low temperature fixability, a toner for developing an electrostatic image, containing a crystalline organic compound having a melting point of 50 to 150° C. as a fixing assistant, in which the resin and the fixing assistant are compatibilized in heating.

PTL 3 describes, as a toner for developing an electrostatic image that can provide low temperature fixability, heat resistant storage stability, and fixing releasability, a toner including a matrix phase formed of a polyester resin, having dispersed therein a styrene-acrylic resin and a release agent as a domain phase.

CITATION LIST

Patent Literatures

PTL 1: JP 2008-33057 A

PTL 2: JP 2012-22331 A

PTL 3: JP 2016-53677 A

SUMMARY OF INVENTION

Technical Problem

The present invention is to provide a novel toner that achieves both low temperature fixability and storage stability simultaneously.

Solution to Problem

The present invention proposes a toner including particles containing a binder resin, a colorant, and wax, the toner having, in differential scanning calorimetry (DSC) performing a temperature program including steps of heating from 40° C. to 100° C. or more at a heating rate of 10° C./min (first heating), then cooling to 40° C. or less at a cooling rate of 10° C./min (first cooling), and then heating to 100° C. or more at a heating rate of 10° C./min (second heating), a total endothermic amount HA1 in the first heating from 40° C. to 100° C. and a total endothermic amount HA2 in the second heating from 40° C. to 100° C. that satisfy the following relationship (1), and a difference between a full width at half maximum of an endothermic peak in the second heating and a full width at half maximum of an exothermic peak in the first cooling of 7.00° C. or less.

$$HA2/HA1>0.80 \quad (1)$$

The present invention also proposes a toner including particles containing a binder resin, a colorant, and wax, the toner having, in differential scanning calorimetry (DSC) performing a temperature program including steps of heating from 40° C. to 100° C. or more at a heating rate of 10° C./min (first heating), then cooling to 40° C. or less at a cooling rate of 10° C./min (first cooling), and then heating to 100° C. or more at a heating rate of 10° C./min (second heating), a total endothermic amount HA1 in the first heating from 40° C. to 100° C. and a total endothermic amount HA2 in the second heating from 40° C. to 100° C. that satisfy the following relationships (1) and (3).

$$HA2/HA1>0.80 \quad (1)$$

$$HA2\geq 20\ J/g \quad (3)$$

Specifically, the substance of the present invention resides in the following items [1] to [15].

[1] A toner including particles containing a binder resin, a colorant, and wax, the toner having, in differential scanning calorimetry (DSC) performing a temperature program including steps of heating from 40° C. to 100° C. or more at a heating rate of 10° C./min (first heating), then cooling to 40° C. or less at a cooling rate of 10° C./min (first cooling), and then heating to 100° C. or more at a heating rate of 10° C./min (second heating), a total endothermic amount HA1 in the first heating from 40° C. to 100° C. and a total endothermic amount HA2 in the second heating from 40° C. to 100° C. that satisfy the following relationship (1), and a difference between a full width at half maximum of an endothermic peak in the second heating and a full width at half maximum of an exothermic peak in the first cooling of 7.00° C. or less:

$$HA2/HA1>0.80 \quad (1).$$

[2] The toner according to the item [1], wherein the HA2 satisfies the following relationship (3):

$$HA2\geq 20\ J/g \quad (3)$$

[3] The toner according to the item [1] or [2], wherein the toner has, in the differential scanning calorimetry (DSC) performing the temperature program, a difference between a full width at half maximum of an endothermic peak in the first heating and a full width at half maximum of an exothermic peak in the first cooling of 7.0° C. or less.

[4] A toner including particles containing a binder resin, a colorant, and wax, the toner having, in differential scanning calorimetry (DSC) performing a temperature program including steps of heating from 40° C. to 100° C. or more at a heating rate of 10° C./min (first heating), then cooling to 40° C. or less at a cooling rate of 10° C./min (first cooling), and then heating to 100° C. or more at a heating rate of 10° C./min (second heating), a total endothermic amount HA1 in the first heating from 40° C. to 100° C. and a total endothermic amount HA2 in the second heating from 40° C. to 100° C. that satisfy the following relationships (1) and (3):

$$HA2/HA1>0.80 \quad (1)$$

$$HA2\geq 20\ J/g \quad (3).$$

[5] The toner according to the item [4], wherein the toner has, in the differential scanning calorimetry (DSC) performing the temperature program, a difference between a full width at half maximum of an endothermic peak in the first heating and a full width at half maximum of an exothermic peak in the first cooling of 7.0° C. or less, and a difference between a full width at half maximum of an endothermic peak in the second heating and a full width at half maximum of an exothermic peak in the first cooling of 7.00° C. or less.

[6] The toner according to any one of the items [1] to [5], wherein the difference between a full width at half maximum of an endothermic peak in the second heating and a full width at half maximum of an exothermic peak in the first cooling of 6.0° C. or less.

[7] The toner according to any one of the items [1] to [6], wherein the HA1 satisfies the following relationship (2):

$$HA1\geq 20\ J/g \quad (2).$$

[8] The toner according to any one of the items [1] to [7], wherein the wax is ester based wax.

[9] The toner according to any one of the items [1] to [8], wherein the wax contains two or more kinds of ester based wax.

[10] The toner according to any one of the items [1] to [9], wherein the toner has a total content of the wax of 10.0 to 20.0% by mass.

[11] The toner according to the item [8] or [9], wherein at least one kind of the ester based wax has a melting point of 70 to 80° C. and is ester based wax that is not compatible with the binder resin even in a molten state (which is referred to as "low temperature fixing wax").

[12] The toner according to the item [11], wherein the toner has a content of the low temperature fixing wax of 30 to 80% by mass based on the total content (100% by mass) of the wax.

[13] The toner according to any one of the items [1] to [12], wherein the toner has a volume median particle diameter of 6.5 μm or less and a content in terms of number percentage of particles that have a particle diameter of 1.0 μm or less of 3.0% or less.

[14] A toner cartridge including the toner according to any one of the items [1] to [13].

[15] An image formation device including the toner according to any one of the items [1] to [13].

Advantageous Effects of Invention

According to the toner proposed by the present invention, the low temperature fixability can be enhanced while retaining the storage stability.

BRIEF DESCRIPTION OF DRAWINGS

FIG. 1 is a diagram showing the DSC curves in the first heating and the second heating of the toner obtained in Example 1.

FIG. 2 is a diagram showing the DSC curves in the first heating and the second heating of the toner obtained in Comparative Example 1.

DESCRIPTION OF EMBODIMENTS

The present invention will be described with reference to embodiments below. However, the present invention is not limited to the embodiments described below.

<<Present Toner>>

The toner according to one example of an embodiment of the present invention (which may be referred to as a "present toner") is preferably a toner including toner base particles containing a binder resin, a colorant, and wax, and depending on necessity further containing a charge controlling agent and additional components (which may be referred to as "present toner base particles"), and an external additive.

However, the toner according to the present invention is not necessarily limited to the aforementioned configuration of the present toner. For example, the charge controlling agent and the external additive may be omitted.

The present toner has the following features.

Specifically, the present toner has, in differential scanning calorimetry (DSC) performing a temperature program including steps of heating from 40° C. to 100° C. or more at a heating rate of 10° C./min (first heating), then cooling to 40° C. or less at a cooling rate of 10° C./min (first cooling), and then heating to 100° C. or more at a heating rate of 10° C./min (second heating), a total endothermic amount HA1 in the first heating from 40° C. to 100° C. and a total endothermic amount HA2 in the second heating from 40° C. to 100° C. that satisfy the following relationship (1).

$$HA2/HA1>0.80 \quad (1)$$

In the following description, the case where the compound exhibiting endotherm in heating and exotherm in cooling, from 40° C. to 100° C. is wax will be described.

However, the present toner is not limited only to the case where the compound exhibiting the thermal property is wax, as far as the technical concept thereof described later can be applied thereto. Therefore, it is not necessary to demonstrate that the thermal characteristics shown below are derived from (attribute to) the wax.

The case of HA2/HA1=1.0, i.e., the case where the total endothermic amount in the first heating from 40° C. to 100° C. and the total endothermic amount in the second heating from 40° C. to 100° C. are the same as each other, shows that the crystal states of the wax in the toner in the first heating and the second heating are equivalent to each other. Specifically, the case shows that at the time when the wax is in a liquid state by heating to a temperature of the melting point or more, the wax is not compatible or mixed with the binder resin of the toner, and returns to the crystal state equivalent to before heating through recrystallization by cooling.

The case of HA2/HA1=0, i.e., the total endothermic amount in the second heating from 40° C. to 100° C. is zero, shows that the crystal component of the wax does not remain in the toner in the second heating. Specifically, the case shows that at the time when the wax is in a liquid state by heating to a temperature of the melting point or more, the wax is compatible or mixed with the binder resin of the toner, and cannot be recrystallized by cooling.

The present toner satisfies HA2/HA1>0.80. Specifically, this shows that the prescribed proportion or more of the wax is recrystallized even after the heating step and the cooling step. It is considered that the hardness is increased through recrystallization of the prescribed portion or more of the wax, and thereby the low temperature fixability and the storage stability are improved.

There may be a case where the wax in the liquid state by the first heating is increased in crystallinity in cooling. In this case, the value of HA2/HA1 exceeds 1.0, and the case is encompassed in the present toner since the case is equivalent in the point that the wax in the liquid state is not compatible or mixed with the binder resin of the toner.

In this standpoint, HA2/HA1 is more preferably 0.85 or more and 1.0 or less.

In the present toner, the HA2 preferably satisfies the following relationship (3).

$$HA2 \geq 20\ J/g \quad (3)$$

The case of HA2>19 J/g evidences that the wax is recrystallized in cooling, and thereby the toner has excellent storage stability.

In this standpoint, HA2 is more preferably 20 J/g or more, further preferably 22 J/g or more, and particularly preferably 25 J/g or more. The upper limit thereof is generally 50 J/g or less from the standpoint of the balance of the printing characteristics.

In the present toner, the HA1 preferably satisfies the following relationship (2).

$$HA1 \geq 20\ J/g \quad (2)$$

In the case where the value of HA1 is the lower limit value or more, the releasability sufficient for low temperature fixing can be expected.

In this standpoint, HA1 is more preferably 22 J/g or more, and particularly preferably 25 J/g or more. The upper limit thereof is generally 50 J/g or less from the standpoint of the balance of the printing characteristics.

In the case where the values of HA1 and HA2 are the upper limit values or less, the wax is contained in the present toner in an appropriate amount, and thereby the failures in printing, such as filming and contamination of the charging roller (PCR), can be suppressed.

In the differential scanning calorimetry (DSC), in the case where the entire endothermic peak or exothermic peak falls within the range of 40° C. to 100° C., the entire region thereof is subject to HA1 or HA2. There may be a case where the peak does not converge (i.e., the peak is in the middle of the slope) at least one of the boundaries of the measurement range, i.e., 40° C. and 100° C. In this case, the peak is identified relative to the baseline in ranges including less than 40° C. or more than 100° C., and then the thermal amount only in the range of 40° C. to 100° C. is designated as HA1 or HA2.

The difference between the full width at half maximum of the endothermic peak in heating and the full width at half maximum of the exothermic peak in cooling shows the extent of the sharp meltability of the wax in the toner. The sharp meltability herein means that at the time when the wax in the toner reaches the melting point, the state thereof changes from the solid state to the liquid state within a short period of time. The wax in the toner changes from the solid state to the liquid state by heating to migrate to the surface of the toner, and thereby imparting the function of a release agent thereto. Therefore, for achieving low temperature fixability, it is necessary that the wax in the toner entirely becomes the liquid state within an extremely short period of time (approximately 1 second) during passing through the fixing device of the image formation device, i.e., the wax has high sharp meltability. The wax that has high sharp meltability, i.e., changes from the solid state to the liquid state immediately, has a sharp endothermic peak in heating and a sharp exothermic peak in cooling, and a small difference between the full width at half maximum of the endothermic peak in heating and the full width at half maximum of the exothermic peak in cooling.

The present toner preferably has a "difference between the full width at half maximum of the endothermic peak in the second heating and the full width at half maximum of the exothermic peak in the first cooling" of 7.00° C. or less. In addition, the present toner preferably has a "difference between the full width at half maximum of the endothermic peak in the first heating and the full width at half maximum of the exothermic peak in the first cooling" of 7.0° C. or less. In other words, both the difference between the full width at half maximum of the endothermic peak in the second heating and the full width at half maximum of the exothermic peak in the first cooling and the difference between the full width at half maximum of the endothermic peak in the first heating and the full width at half maximum of the exothermic peak in the first cooling are preferably 7.00° C. or less. Accordingly, in the present toner, the wax in the toner more preferably has high sharp meltability equivalent between the first heating and the second heating.

In the case where the difference between the full width at half maximum of the endothermic peak in the first heating and the full width at half maximum of the exothermic peak in the first cooling is 7.0° C. or less, the wax has sufficiently high sharp meltability, and the toner is excellent in low temperature fixability.

Accordingly, this difference in full width at half maximum of the present toner is preferably 7.0° C. or less, more preferably 6.0° C. or less, further preferably 5.0° C. or less, still further preferably 3.0° C. or less, and particularly preferably 1.5° C. or less.

In the case where the difference between the full width at half maximum of the endothermic peak in the second heating and the full width at half maximum of the exothermic peak in the first cooling is 7.00° C. or less, the wax has sufficiently high crystallinity, and the toner is excellent in storage stability.

Accordingly, this difference in full width at half maximum of the present toner is preferably 7.00° C. or less, more preferably 6.0° C. or less, further preferably 5.0° C. or less, still further preferably 3.0° C. or less, and particularly preferably 1.5° C. or less.

In the differential scanning calorimetry (DSC), in the case where the peak does not converge (i.e., the peak is in the middle of the slope) at least one of 40° C. or 100° C., the peak is managed as follows. Specifically, the endothermic peak or the exothermic peak is identified relative to the baseline in ranges including less than 40° C. or more than 100° C., and then the full width at half maximum of the peak itself is employed. In other words, the temperature targeted by the value of the full width at half maximum is allowed to include ranges including less than 40° C. or more than 100° C.

The specific measure for achieving the present toner satisfying the aforementioned properties is not limited. In particular, as described later, the properties are more preferably achieved through optimization of the selection of the compound used as the wax and the content ratio thereof, and in the case where multiple kinds of wax are used in combination, through the combination, the mixing ratio, and the like thereof. In the case where the wax is a mixture or contains an impurity, a by-product, or the like, the properties can also be achieved through the purity thereof.

The properties can also be preferably achieved through the selection and combination of the binder resin described later and the wax. For example, even in the toners containing the same ester based wax in the same content, there is a tendency that the toner using a polystyrene based copolymer resin or a poly(meth)acrylic based resin as the binder resin can easily satisfy the properties, as compared to the toner using a polyester based resin as the binder resin.

In the present invention, it is necessary that the differential scanning calorimetry (DSC) of the toner is performed at a rate of 10° C./min as described above in all the first heating, the first cooling, and the second heating. In more detail, the rate is preferably 10.0° C./min, and is allowed to be in a range of 10.0±0.5° C./min.

The endothermic amount, the exothermic amount, and the full widths at half maximum of the endothermic peak and the exothermic peak all largely depend on the heating rate or the cooling rate, and therefore in the case where the measurement is performed, for example, at 5° C./min or 15° C./min, are largely different from the case where the measurement is performed at 10° C./min.

As a known technique, a technique of mixing a crystalline polyester for the purpose of enhancing the low temperature fixability of the toner has been known. The functional mechanism of the technique is as follows.

In the case where the temperature of the crystalline polyester is increased to the melting temperature or more, the crystalline polyester is melted to become compatible with the binder resin, and thereby the glass transition temperature (which may be referred to as "Tg") of the binder resin can be lowered. As a result, the toner can be melted at a lower temperature, and the low temperature fixability of the toner can be enhanced.

However, in the case where the crystalline polyester has the characteristics of lowering the Tg of the binder resin by becoming compatible with the binder resin, the toner is also influenced by the heat that occurs in exposure to a high temperature under the storage environment, for example, inside the cartridge. Accordingly, a problem of lowering the heat resistance of the toner in storing may occur in some cases. Furthermore, the crystalline polyester becoming compatible with the binder resin does not exhibit the releasability, and therefore it is necessary to add wax separately from the crystalline polyester.

On the other hand, it is estimated that the present toner exhibits the low temperature fixability, for example, by the following mechanism.

The present toner contains a compound that shows endotherm in heating and shows exotherm in cooling from 40° C. to 100° C. (which may be referred to as a "compound having the particular thermal property"), and in heating the present toner to a sufficient temperature, the compound having the particular thermal property is immediately melted, and the most part thereof is not compatible or mixed with the binder resin, but bleeds out to the surface of the toner. As a result, the compound having the particular thermal property shows the releasability on the surface of the toner, and can enhance the low temperature fixability of the toner. Furthermore, since the compound having the particular thermal property is not compatible or mixed with the binder resin, the Tg of the binder resin is not lowered, and the heat resistance of the toner is prevented from being deteriorated in storing or after fixing.

As a result of the investigation by the present inventors, it has been found that the characteristics of the present toner appear as the following features in differential scanning calorimetry (DSC).

While the endothermic peak due to melting of the compound having the particular thermal property appears in the first heating, since the molten compound is not compatible or mixed with the binder resin, not only the exothermic peak due to recrystallization thereof appears in the first cooling, but also the endothermic peak due to the second melting thereof appears in the second heating.

In the known technique described above, it is considered that since the crystalline polyester becomes compatible with the binder resin, the recrystallization less occurs, and the endothermic peak due to the second melting in the second heating is small.

Consequently, as described later, in the present toner, even in the case where the compound having the particular thermal property is in a molten state by heating to the melting point or more, the compound exists without being compatible with the binder resin, and in this state, enhances the low temperature fixability, which is the mechanism enhancing the low temperature fixability that is completely different from the ordinary toners. Furthermore, the Tg of the binder resin in the toner is not lowered, and thereby the storage stability can also be enhanced.

<Present Toner Base Particles>

The present toner base particles may have a single layer structure or a multilayer structure including a core layer and an external layer (which may be referred to as a "shell layer").

The present toner base particles that have a single layer structure preferably contain a binder resin, a colorant, and wax, and preferably further contain a charge controlling agent and other additives depending on necessity.

In the case where the present toner base particles have a multilayer structure including a core layer and a shell layer, the core layer preferably contains a binder resin, a colorant, and wax, and preferably further contains a charge controlling agent and other additives depending on necessity. The wax in the core layer is preferably a combination use of two or more kinds of wax.

The shell layer preferably contains high heat resistant resin fine particles, a charge controlling agent, and wax. The wax contained in the shell layer is more effective for preventing offset on the high temperature side.

<Binder Resin>

The binder resin may be binder resins that have been ordinarily used for producing toners, and is not particularly limited. Examples thereof include a thermoplastic resin, such as a polystyrene based resin, a poly(meth)acrylic based resin, a polyolefin based resin, an epoxy based resin, and a polyester based resin, and a mixture of the resins.

The binder resin is produced, for example, by polymerizing a monomer component in the process of producing the toner by the polymerization method.

As the monomer component used for producing the binder resin, a monomer that has been ordinarily used in the production of a binder resin of a toner may be appropriately used. For example, any polymerizable monomer may be used among a polymerizable monomer having an acidic group (which may be hereinafter referred simply to as an acidic monomer), a polymerizable monomer having a basic group (which may be hereinafter referred simply to as a basic monomer), and a polymerizable monomer that does not have an acidic group and a basic group (which may be hereinafter referred to as other monomers).

(Polystyrene Based Copolymer Resin or Poly(meth) acrylic Based Resin)

In the case where the binder resin is a polystyrene based copolymer resin or a poly(meth)acrylic based resin, examples of the monomer therefor include the monomers shown below. The term "(meth)acrylic" herein means "acrylic or methacrylic".

The "styrene based or (meth)acrylic based monomer" may be hereinafter referred simply to as a "monomer composition".

Examples of the acidic monomer include a polymerizable monomer having a carboxy group, such as acrylic acid, methacrylic acid, maleic acid, fumaric acid, and cinnamic acid; a polymerizable monomer having a sulfonic acid group, such as sulfonated styrene; and a polymerizable monomer having a sulfonamide group, such as vinylbenzenesulfoneamide.

Examples of the basic monomer include an aromatic vinyl compound having an amino group, such as aminostyrene; a nitrogen-containing heterocyclic ring-containing polymerizable monomer, such as vinylpyridine and vinylpyrrolidone; and a (meth)acrylate ester having an amino group, such as dimethylaminoethyl acrylate and diethylaminoethyl methacrylate.

These acidic monomers and basic monomers contribute to the dispersion stability of the present toner base particles. These monomers may be used alone or as a mixture of multiple kinds thereof, and may exist as a salt associated with a counter ion.

Examples of the other monomers include a styrene compound, such as styrene, methylstyrene, chlorostyrene, dichlorostyrene, p-t-butylstyrene, p-n-butylstyrene, and p-n-nonylstyrene; an acrylate ester compound, such as methyl acrylate, ethyl acrylate, propyl acrylate, n-butyl acrylate, isobutyl acrylate, hydroxyethyl acrylate, and 2-ethylhexyl acrylate; a methacrylate ester compound, such as methyl methacrylate, ethyl methacrylate, propyl methacrylate, n-butyl methacrylate, isobutyl methacrylate, hydroxyethyl methacrylate, and 2-ethylhexyl methacrylate; and an acrylamide compound, such as acrylamide, N-propylacrylamide, N,N-dimethylacrylamide, N, N-dipropylacrylamide, and N,N-dibutylacrylamide. The "other monomers" may be used alone or as a combination of multiple kinds thereof.

In the case where the binder resin is a crosslinked resin, a polyfunctional monomer is used with the polymerizable monomer above. Examples of the polyfunctional monomer include divinylbenzene, hexanediol diacrylate, ethylene glycol dimethacrylate, diethylene glycol dimethacrylate, triethylene glycol dimethacrylate, tetraethylene glycol dimethacrylate, hexaethylene glycol dimethacrylate, nonaethylene glycol dimethacrylate, diethylene glycol diacrylate, triethylene glycol diacrylate, neopentyl glycol dimethacrylate, neopentyl glycol diacrylate, and diallyl phthalate.

The polyfunctional monomer is preferably a bifunctional polymerizable monomer, and particularly preferably divinylbenzene, hexanediol diacrylate, and the like. The polyfunctional monomer may be used alone or as a mixture of multiple kinds thereof. A polymerizable monomer having a reactive group in a pendant group, such as glycidyl methacrylate, methylolacrylamide, and acrolein, may also be used.

A known chain transfer agent may be used depending on necessity.

Specific examples of the chain transfer agent include t-dodecylmercaptan, dodecanethiol, diisopropyl xanthogen, carbon tetrachloride, and trichlorobromomethane. The chain transfer agent may be used alone or as a combination of two or more kinds thereof, and is preferably 0 to 5% by mass based on the polymerizable monomer.

In the case where a polystyrene based copolymer resin or a poly(meth)acrylic based resin is used as the binder resin, the number average molecular weight thereof by gel permeation chromatography (which may be hereinafter referred to as GPC) is preferably 5,000 or more, more preferably 8,000 or more, and further preferably 10,000 or more, and is preferably 30,000 or less, more preferably 20,000 or less, and further preferably 15,000 or less. The mass average molecular weight thereof is preferably 70,000 or more, and more preferably 90,000 or more, and is preferably 300,000 or less, and more preferably 250,000 or less.

(Polyester Based Resin)

In the case where the binder resin is a polyester based resin, examples of the monomer therefor include the dihydric alcohols and the dibasic acids shown below.

Examples of the dihydric alcohol include a diol compound, such as ethylene glycol, diethylene glycol, triethylene glycol, 1,2-propylene glycol, 1,3-propylene glycol, 1,4-butanediol, neopentyl glycol, 1,4-butenediol, 1,5-pentanediol, and 1,6-hexanediol, bisphenol A, hydrogenated bisphenol A, and a bisphenol A alkylene oxide adduct, such as polyoxyethylenated bisphenol A and polyoxypropylenated bisphenol A.

Examples of the dibasic acid include maleic acid, fumaric acid, citraconic acid, itaconic acid, glutaconic acid, phthalic acid, isophthalic acid, terephthalic acid, cyclohexanedicarboxylic acid, succinic acid, adipic acid, sebacic acid, azelaic acid, malonic acid, and anhydrides and lower alkyl esters of these acids; an alkenylsuccinic acid or an alkylsuccinic acid, such as n-dodecenylsuccnic acid and n-dodecylsuccinic acid; and other dibasic acids.

In the case where the binder resin is a crosslinked resin, a polyfunctional monomer is used with the polymerizable monomer above. As the polyfunctional monomer, for example, a trihydric or higher hydric alcohol include sorbitol, 1,2,3,6-hexanetetraol, 1,4-sorbitan, pentaerythritol, dip entaerythritol, trip entaerythritol, sucrose, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene.

Examples of a tribasic or higher basic acid include 1,2,4-benzenetricarboxylic acid, 1,2,5-benzenetricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylenecarboxypropane, tetra(methylenecarboxyl)methane, 1,2,7,8-octanetetracarboxylic acid, and anhydrides of these acids.

The polyester resin may be synthesized by an ordinary method. Specifically, the conditions including the reaction temperature (170 to 250° C.), the reaction pressure (5 mmHg to ordinary pressure), and the like are determined depending on the reactivity of the monomers, and the reaction is terminated at the time when the prescribed property is obtained. In the case where a polyester based resin is used as the binder resin, the number average molecular weight thereof by GPC (polystyrene conversion value) is preferably 2,000 to 20,000, and more preferably 3,000 to 12,000.

(Colorant)

The colorant used may be optionally selected from known colorants. Specific examples of the colorant include known dyes or pigments, such as carbon black, aniline blue, phthalocyanine blue, phthalocyanine green, hansa yellow, a rhodamine based dye or pigment, chrome yellow, a quinacridone based compound, benzidine yellow, rose bengal, a triallylmethane based dye, and monoazo based, disazo based, and condensed azo based dyes or pigments, which may be used alone or as a mixture thereof.

For a full-color toner, it is preferred to use monoazo based, disazo based, polyazo based, and condensed azo based dyes or pigments for yellow; quinacridone based and/or monoazo based dyes or pigments for magenta; a phthalocyanine based dye or pigment for cyan; and carbon black or the like for black. As for the combination of the toner set, it is preferred that a magenta toner preferably contains a quinacridone based dye or pigment and/or a monoazo based dye or pigment, a black toner contains carbon black, a cyan toner contains a copper phthalocyanine based dye or pigment, and a yellow toner contains at least one kind of a dye or pigment selected from monoazo based, disazo based, and condensed azo based dyes or pigments, from the standpoint of regulating TP2/TP1.

Specific examples thereof include C.I. Pigment Blue 15:3 and C.I. Pigment Blue 15:4 for cyan, C.I. Pigment Yellow 74, C.I. Pigment Yellow 83 as a disazo based dye or pigment, C.I. Pigment Yellow 93 as a condensed azo based dye or pigment, C.I. Pigment Yellow 155, C.I. Pigment Yellow 180, and C.I. Pigment Yellow 185 for yellow, and C.I. Pigment Red 48:1, C.I. Pigment Red 53:1, C.I. Pigment Red 57:1, C.I. Pigment Red 5, C.I. Pigment Red 122 as a quinacridone based dye or pigment, C.I. Pigment Red 209, and C.I. Pigment Red 269 (238) as a monoazo based dye or pigment for magenta.

The colorant is preferably used in an amount of 3 parts by mass or more and 20 parts by mass or less per 100 parts by mass of the present toner.

<Wax>

The melting point peak (i.e., the endothermic peak top in the second heating in DSC of the toner) of the wax contained in the present toner is preferably 90° C. or less, more preferably 85° C. or less, and further preferably 80° C. or less, and is preferably 50° C. or more, more preferably 60° C. or more, and further preferably 65° C. or more. In the case where the melting point peak temperature of the wax is too low, there is a tendency that the blocking resistance is deteriorated, and in the case where the melting point peak of the wax is too high, there is a tendency that the low temperature fixability and the high glossiness are impaired. The difference between the melting point peak of the wax and the onset temperature (i.e., the temperature of the intersection point of the base line before the endothermic peak in the second heating in DSC of the toner and the tangent line at the first inflection point appearing before the endothermic peak) of the wax is preferably 15° C. or less, and more preferably 10° C. or less.

The onset temperature of the wax is preferably 86° C. or less, more preferably 81° C. or less, and further preferably 76° C. or less, and is preferably 46° C. or more, more preferably 56° C. or more, and further preferably 61° C. or more. In the case where the onset temperature is low, there is a tendency that the low temperature fixability and the high glossiness are improved, and in the case where the onset temperature is high, there is a tendency that the blocking resistance is improved.

The kind of the wax contained in the present toner is not limited. In particular, ester based wax is preferably contained, and at least two kinds of ester based wax are particularly preferably contained.

Due to two or more kinds of ester based wax contained, the effect of low temperature fixing can be enhanced in some cases.

Examples of the ester based wax include ester based wax containing a long-chain aliphatic group, such as behenyl behenate, a montanate ester, stearyl stearate, and erythritol tetrabehenate.

Among these, monoester wax mainly containing C18 and/or C22 hydrocarbon is further preferred, and from the standpoint of the low dust formation and the low temperature fixing, behenyl behenate, stearyl behenate, behenyl stearate, and a material mainly containing these compounds.

The number of carbon atoms in one molecule of the ester based wax is preferably 36 or more, and more preferably 40 or more, from the standpoint of the low dust formation, and is preferably 95 or less, more preferably 60 or less, further preferably 48 or less, and particularly preferably 44 or less, from the standpoint of the low temperature fixing.

(Low Temperature Fixing Wax)

In the present toner, at least one kind of the ester based wax is ester based wax that has a melting point of 70 to 80° C. and is not compatible with the binder resin in melting (which may be referred to as "low temperature fixing wax").

The melting point herein means the temperature of the endothermic peak (peak top) in the second heating of the differential scanning calorimetry (DSC) in performing the DSC of the toner.

As the low temperature fixing wax, a compound that has a relatively low melting point and is not compatible with the binder resin in a molten state is preferably selected and used.

In the case where the compound is contained in the toner particles, even though the compound is in a molten state by increasing the temperature to the melting point thereof or more, the compound does not become compatible with the binder resin, but bleeds outside the toner to enhance the low temperature fixability of the toner.

The melting point of the low temperature fixing wax is preferably 70 to 80° C., particularly preferably 78° C. or less, and more particularly preferably 75° C. or less.

Examples of the low temperature fixing wax include, among the aforementioned kinds of the ester based wax, behenyl behenate and erythritol tetrabehenate.

However, all the kinds of the ester based wax cannot function as the low temperature fixing wax. For example, behenyl behenate having been ordinarily used contains a short chain component, and the short chain component becomes compatible with the binder resin to fail to enhance the low temperature fixability. Accordingly, as for behenyl behenate, a material containing a component having 22 or more carbon atoms in an amount of 60% by mass or more is preferred.

(Other Wax)

The present toner may contain other wax than the ester based wax, and may contain other wax in combination with the ester based wax.

Examples thereof include olefin based wax, such as low molecular weight polyethylene, low molecular weight polypropylene, and a copolymer polyethylene; paraffin wax; a vegetable based wax, such as hydrogenated castor oil and carnauba wax; a ketone having a long-chain alkyl group, such as distearyl ketone; a silicone having an alkyl group; a higher fatty acid, such as stearic acid; and a higher fatty acid amide, such as oleic acid amid and stearic acid amide. Preferred examples thereof include hydrocarbon based wax, such as paraffin wax and Fischer-Tropsch wax; and silicone based wax.

(Amount of Wax)

The amount of wax (total amount of two or more kinds thereof) is preferably 10.0% by mass or more based on the present toner as 100% by mass. The amount thereof is preferably 30% by mass or less, and more preferably 20% by mass or less.

In the total content (100% by mass) of the wax, the content of the low temperature fixing wax is preferably 30% by mass or more, and more preferably 40% by mass or more, and is preferably 80% by mass or less.

(Charge Controlling Agent)

The charge controlling agent used may be optionally selected from the known charge controlling agents. Specific examples of the charge controlling agent include a nigrosine dye, an amino group-containing vinyl based copolymer, a quaternary ammonium salt compound, and a polyamine resin for positive charge, and a metal-containing azo dye containing a metal, such as chromium, zinc, iron, cobalt, or aluminum, and a metal salt and a metal complex obtained from salicylic acid or alkyl salicylate with the aforementioned metal for negative charge.

The amount of the charge controlling agent is preferably 0.1 to 25 parts by mass, and more preferably 1 to 15 parts by mass, per 100 parts by mass of the present toner.

The charge controlling agent may be mixed inside the toner base particles, and may be used by being attached to the surface of the toner base particles.

<High Heat Resistant Resin Fine Particles>

The high heat resistant resin fine particles mean particles existing in the toner base particles or on the surface of the base particles (shell layer) in a state that the particles are not compatible with the binder resin. The resin constituting the high heat resistant resin fine particles may be selected from the resins that are generally used as the binder resin used in the production of the toner. Examples thereof include a thermoplastic resin, such as a polystyrene based resin, a poly(meth)acrylic based resin, a polyolefin based resin, an epoxy based resin, and a polyester based resin; and a mixture of the resins.

<External Additive>

The present toner generally includes an external additive for enhancing the fluidity of the toner and for enhancing the charge controlling capability.

The external additive used may be appropriately selected from various inorganic and organic fine particles. Two or more kinds of external additives may be used.

Examples of the inorganic fine particles used include various carbides, such as silicon carbide, boron carbide, titanium carbide, zirconium carbide, hafnium carbide, vanadium carbide, tantalum carbide, niobium carbide, tungsten carbide, chromium carbide, molybdenum carbide, and calcium carbide, various nitrides, such as boron nitride, titanium nitride, and zirconium nitride, various borate, such as zirconium borate, various oxides, such as titanium oxide, calcium oxide, magnesium oxide, zinc oxide, copper oxide, aluminum oxide, cerium oxide, silica, and colloidal silica, various titanic acid compound, such as calcium titanate, magnesium titanate, and strontium titanate, a phosphoric acid compound, such as calcium phosphate, a sulfide, such as molybdenum disulfide, a fluoride, such as magnesium fluoride and carbon fluoride, various metal soaps, such as aluminum stearate, calcium stearate, zinc stearate, and magnesium stearate, talcum, bentonite, various kinds of carbon black and conductive carbon black, magnetite, and ferrite.

Examples of the organic fine particles used include fine particles of a styrene based resin, an acrylic based resin, an epoxy based resin, and a melamine based resin. Fine particles containing a fluorine atom may be used for enhancing the charge stability. Among these external additives, silica, titanium oxide, alumina, zinc oxide, various kinds of carbon black and conductive carbon black, and the like are particularly preferably used. The external additive used may be the inorganic and organic fine particles described above having been subjected to a surface treatment, such as a hydrophobic treatment, with a treatment agent, for example, a silane coupling agent, such as hexamethyldisilazane (HMDS) and dimethyldichlorosilane (DMDS), a titanate based coupling agent, a silicone oil treatment agent, such as a silicone oil, a dimethyl silicone oil, a modified silicone oil, and an amino-modified silicone oil, a silicone varnish, a fluorine based silane coupling agent, a fluorine based silicone oil, and a coupling agent having an amino group or a quaternary ammonium salt group. Two or more kinds of the treatment agents may be used in combination.

The amount of the external additive added is preferably 1.0 part by mass or more, and particularly preferably 1.5 parts by mass or more, and is preferably 6.5 parts by mass or less, and particularly preferably 5.5 parts by mass or less, per 100 parts by mass of the present toner base particles.

In the present toner, conductive fine particles may be used as an external additive from the standpoint of the charge control. Examples of the conductive fine particles include a metal oxide, such as conductive titanium oxide, silica, and magnetite, or the metal oxide doped with a conductive substance, organic fine particles including a polymer having a conjugated double bond, such as polyacetylene, polyphenylacetylene, and poly-p-phenylene, doped with a conductive substance, such as a metal, and carbon represented by carbon black and graphite, and conductive titanium oxide or conductive titanium oxide doped with a conductive substance is more preferred from the standpoint of capability of imparting conductivity without impairing the fluidity of the toner.

The lower limit of the content of the conductive fine particles is preferably 0.05 part by mass or more, more preferably 0.1 part by mass or more, and particularly preferably 0.2 part by mass or more, per 100 parts by mass of the present toner base particles. The upper limit of the content of the conductive fine particles is preferably 3 parts by mass or less, more preferably 2 parts by mass or less, and particularly preferably 1 part by mass or less.

<Form of Present Toner>

The volume median particle diameter of the present toner is preferably 6.5 μm or less, particularly preferably 6.3 μm or less, and more particularly preferably 6.0 μm or less, from the standpoint of the image reproducibility and the consumption of the toner.

The volume median particle diameter thereof is preferably 3.0 μm or more, particularly preferably 4.0 μm or more, and more particularly preferably 4.5 μm or more, from the standpoint of the environmental safety against dust.

The "volume median particle diameter ($DV_{50}$)" in the present invention is defined as a value that is measured according to the method described in the examples corresponding to the size thereof.

The content in terms of number percentage of particles that have a particle diameter of preferably 1.0 μm or less is preferably 3.0% or less, particularly preferably 2.0% or less, and more particularly 1.0% or less, for stably providing an image with high quality by preventing fogging, white background contamination, and the like.

As for the shape of the present toner, the average degree of circularity thereof measured with a flow type particle image analyzer, FPIA-3000 (available from Malvern Panalytical, Ltd.) is preferably 0.92 or more and 0.99 or less, particularly preferably 0.95 or more, and more particularly preferably 0.96 or more.

<<Production Method of Present Toner>>

The present toner can be produced by producing the present toner base particles by a known method, and then externally adding the external additive to the present toner base particles.

<Production Method of Present Toner Base Particles>

The present toner base particles are preferably produced by a production method including an aggregating step, i.e., an aggregation method, from the standpoint of the production stability.

The method of producing the present toner base particles by an aggregation method will be described below. However, the production method is not limited thereto. The present toner base particles may be produced by other methods, such as an emulsion polymerization method, an aggregation method, a suspension polymerization method, a bulk polymerization method, a solution polymerization method, a dissolution suspension method, and a melt kneading and pulverization method, as far as the features of the present toner are obtained.

In the aggregation method, it is preferred that the raw materials are prepared as smaller particles than the size of the toner base particles, and then mixed and aggregated to produce the toner base particles.

The binder resin is preferably prepared in the form of "polymer primary particles" having a smaller size than the toner base particles, so as to prepare a dispersion liquid of the polymer primary particles.

For example, the polymer primary particles containing a styrene based or (meth)acrylic based monomer (monomer composition) can be obtained through emulsion polymerization of the monomer composition and depending on necessity a chain transfer agent, with an emulsifier. The emulsifier used herein may be a known material, and one kind or two or more kinds of emulsifiers selected from a cationic surfactant, an anionic surfactant, and a nonionic surfactant may be used in combination.

The median diameter (D50) of the polymer primary particles is preferably 100 nm or more, more preferably 150 nm or more, and further preferably 180 nm or more, and is preferably 350 nm or less, more preferably 300 nm or less, and further preferably 280 nm or less.

The mass average molecular weight (Mw) of the polymer primary particles is preferably 30,000 or more, more preferably 40,000 or more, and further preferably 50,000 or more, and is preferably 500,000 or less, more preferably 300,000 or less, and further preferably 150,000 or less.

In the aggregating step, the polymer primary particles, the colorant particles, and depending on necessity the mixing components, such as the charge controlling agent and the wax, are mixed simultaneously or sequentially. It is preferred that the dispersion liquids of the components, i.e., a polymer primary particle dispersion liquid, a colorant particle dispersion liquid, and depending on necessity a charge controlling agent dispersion liquid and a wax fine particle dispersion liquid, are produced in advance, and then the dispersion liquids are mixed to provide a mixed dispersion liquid, from the standpoint of the uniformity in composition and the uniformity in particle diameter. The colorant is preferably used in a state of being dispersed in water in the presence of an emulsifier.

In the aggregating step, the aggregation is generally performed in a tank equipped with an agitation device, and the method therefor include a method of heating, a method of adding an electrolyte, and a method of combining these methods. At the time when the polymer primary particles are aggregated under agitation to provide particle aggregates having the target size, the particle diameter of the particle aggregates can be controlled through the balance between the aggregation force of the particles and the shearing force by agitation, and the aggregation force can be increased by heating or adding an electrolyte.

The electrolyte in the case where the aggregation is performed by adding the electrolyte may be any of an acid, an alkali, and a salt, and may be any of an organic material and an inorganic material. Specific examples thereof include hydrochloric acid, nitric acid, sulfuric acid, and citric acid as an acid; sodium hydroxide, potassium hydroxide, and aqueous ammonia as an alkali; and NaCl, KCl, LiCl, $Na_2SO_4$, $K_2SO_4$, $Li_2SO_4$, $MgCl_2$, $CaCl_2$, $MgSO_4$, $CaSO_4$, $ZnSO_4$, $Al_2(SO_4)_3$, $Fe_2(SO_4)_3$, $CH_3COONa$, and $C_6H_5SO_3Na$ as a salt. Among these, an inorganic salt having a divalent or higher valent metal cation is preferred.

The amount of the electrolyte added varies depending on the kind of the electrolyte, the target particle diameter, and the like. The amount thereof is preferably 0.02 part by mass or more, and more preferably 0.05 part by mass or more, and is preferably 25 parts by mass or less, more preferably 15 parts by mass or less, and particularly preferably 10 parts by mass or less, per 100 parts by mass of the solid content of the mixed dispersion liquid. In the case where the amount thereof added is too small, problems, in which the aggregation proceeds too slowly to form fine powder of 1 μm or less remaining after the aggregation, and the average particle diameter of the resulting particle aggregates fails to reach the target particle diameter, may occur in some cases, and in the case where the amount thereof added is too large, problems, in which rapid aggregation is likely to occur, which makes it difficult to control the particle diameter, and the resulting aggregated particles include coarse powder and irregular shape particles, may occur in some cases.

The aggregation temperature in the case where the aggregation is performed by adding the electrolyte is preferably 20° C. or more, and particularly preferably 30° C. or more, and is preferably 70° C. or less, and particularly preferably 60° C. or less.

The period of time required for the aggregation is preferably optimized corresponding to the form of the device and the scale of the process. For achieving the target particle diameter for the particle diameter of the toner base particles, it is preferred to retain at the prescribed temperature described above for at least 30 minutes. The heating to reach the prescribed temperature may be performed by heating at a constant rate or by heating in a stepwise manner.

After the aggregating step, preferably before an aging step or during an aging step, it is preferred that a surfactant is added, the pH is controlled, or both of them are performed.

The surfactant used herein may be at least one kind selected from the emulsifiers that can be used in the production of the polymer primary particles. It is particularly preferred to use the same emulsifier as used in the production of the polymer primary particles.

After the aggregating step and before completing the aging step, it is possible that the surfactant is added, or the pH is controlled, and thereby the aggregation or the like of the particle aggregates obtained in the aggregating step can be suppressed to suppress the formation of coarse particles after the aggregating step, in some cases.

The period of time of the aging step may be controlled to produce toner base particles having various shapes, such as a grape form retaining the aggregated shape of the polymer primary particles, a potato form obtained through progress of fusion, and a spherical form obtained through further progress of fusion, corresponding to the purposes.

<External Addition Method of External Additive>

Examples of the addition method of the external additive include a method using an high speed agitator, such as a Henschel mixer, and a method using equipment capable of applying a compression shearing stress.

The toner may be produced by a one step external addition method of externally adding all the external additives to the toner base particles at one time, or may be produced by a stepwise external addition method of externally adding each of the external additives separately.

Examples of the method of preventing the temperature increase during the external addition include a cooling device provided for the container, and the stepwise external addition method.

<<Miscellaneous Matters>>

The present toner may be used in the form of any of a two-component developer using the toner with a carrier, and a magnetic or non-magnetic one-component developer using no carrier.

In the case where the present toner is used as the two-component developer, known carriers, for example, a magnetic substance, such as iron powder, magnetite powder, and ferrite powder, a magnetic carrier including the magnetic substance having on the surface thereof a resin coating, may be used. The coating resin of the resin-coated carrier used may be a generally known resin, such as a styrene based resin, an acrylic based resin, a styrene-acrylic copolymer resin, a silicone resin, a modified silicone resin, a fluorine resin, and mixtures thereof.

<<Cartridge and Image Formation Device>>

Embodiments of the image formation device including the present toner (i.e., the image formation device of the present invention) will be described. However, the embodiments are not limited to the following description, and may be practiced with optional modifications, as far as the substance of the present invention is not deviated.

The image formation device includes an electrophotographic photoreceptor, a charging device, an exposing device, a developing device, and a toner, and may further include a transferring device, a cleaning device, and a fixing device depending on necessity.

The electrophotographic photoreceptor used is not particularly limited, and may be a photoreceptor in the form of drum including a cylindrical conductive support having on the surface thereof the photoreceptor described above.

The charging device is for uniformly charging the surface of the electrophotographic photoreceptor to a prescribed potential. Examples of the ordinary charging device include a non-contact type corona charging device, such as corotron and scorotron, and a contact type charging device.

The kind of the exposing device is not particularly limited, as far as an electrostatic latent image can be formed on the photosensitive surface of the electrophotographic photoreceptor through exposure of the electrophotographic photoreceptor.

The transferring device is for applying a prescribed voltage (transferring voltage) having the reverse polarity to the charging potential of the toner, so as to transfer the toner image formed on the electrophotographic photoreceptor to recording paper (paper or a medium). The kind of the transferring device is not particularly limited, and a device having an optional system, such as corona transfer or roller transfer, may be used.

The cleaning device is for scraping the residual toner attached to the electrophotographic photoreceptor with a cleaning member, and recovering the residual toner. However, in the case where there is only a small amount of or substantially no toner remaining on the surface of the electrophotographic photoreceptor, the cleaning device may be omitted. The cleaning device used is not particularly limited, and may be an optional cleaning device, such as a brush cleaner, a magnetic roller cleaner, and a blade cleaner.

An image is recorded in the following manner with the image formation device constituted as above.

The surface (photosensitive surface) of the electrophotographic photoreceptor is charged to a prescribed potential with the charging device. At this time, the photosensitive surface may be charged with a direct current voltage or may be charged by superimposing an alternating current voltage on a direct current voltage.

Subsequently, the charged photosensitive surface of the electrophotographic photoreceptor is exposed with the exposing device according to the image to be recorded, so as to form an electrostatic latent image on the photosensitive surface. The electrostatic latent image formed on the photosensitive surface of the electrophotographic photoreceptor is then developed with the developing device.

The developing device thins the toner with a restricting member, such as a developing blade, frictionally charges the toner to the prescribed polarity, conveys the toner by carrying the toner on the developing roller, and brings the toner into contact with the surface of the electrophotographic photoreceptor.

By bringing the charged toner carried on the developing roller into contact with the surface of the electrophotographic photoreceptor, a toner image corresponding to the electrostatic latent image is formed on the photosensitive surface of the electrophotographic photoreceptor. The toner image is then transferred to recording paper or the like with the transferring device. Thereafter, the toner remaining on the photosensitive surface of the electrophotographic photoreceptor but not being transferred is removed with the cleaning device.

After transferring the toner image to the recording paper or the like, the toner image is thermally fixed on the recording paper or the like by being passed through the fixing device, resulting in the final image.

The image formation device may include, for example, a configuration capable of performing a destaticizing step, in addition to the aforementioned configuration. The destaticizing step is for exposing the electrophotographic photoreceptor to destaticize the electrophotographic photoreceptor.

The image formation device may be constituted by further performing modification, and for example, may have a configuration capable of performing steps, such as a preexposure step and an auxiliary charging step, may have a configuration performing offset printing, and may have a configuration of a full-color tandem system using multiple kinds of toners.

A member housing the toner may be combined with one component or two or more components of the charging device, the exposing device, the developing device, the transferring device, the cleaning device, and the fixing device, so as to constitute an integrated cartridge (which may be referred to as a "toner cartridge"), and the toner cartridge may be detachable to the image formation device, such as a duplicator and a laser beam printer.

<<Description of Terms>>

In the description herein, the expression "X to Y" (wherein X and Y each show an arbitrary numeral) encompasses not only "X or more and Y or less" but also "preferably more than X" and "preferably smaller than Y" unless otherwise indicated.

The expression "X or more" (wherein X shows an arbitrary numeral) and "Y or less" (wherein Y shows an arbitrary numeral) encompass "preferably more than X" and "preferably less than Y" respectively.

EXAMPLES

The present invention will be described more specifically with reference to examples below. However, the present invention is not limited to the following examples unless the substance thereof is deviated.

In Examples and Comparative Examples below, a simple expression "part" means "part by mass".

<Measurement of Median Diameter (D50)>

The median diameter (D50) of the particles having a median diameter (D50) of less than 1 μm was measured with Microtrac Nanotrac 150 (hereinafter abbreviated as Nanotrac), available from Nikkiso Co., Ltd., and an analysis software, Microtrac Particle Analyzer Ver. 10.1.2-0.19EE, available from the same company.

Ion exchanged water having a conductivity of 0.5 μS/cm was used as a solvent, the median diameters were measured according to the method described in the instruction manual under the measurement condition of solvent refractive index: 1.333, measurement time: 120 seconds, and number of times of measurement: 5, and the average value thereof was obtained. The other measurement conditions were particle refractive index: 1.59, transmissibility: transmission, shape: spherical, and density: 1.04.

<Measurement of Volume Median Particle Diameter (Dv50)>

The volume median particle diameter (Dv50) of the particles having a volume median particle diameter (Dv50) of 1 μm or more was measured with Multisizer III (aperture diameter: 100 μm, hereinafter abbreviated as Multisizer), available from Beckman Coulter Inc. The volume median particle diameter was measured after dispersing the particles in Isoton II, as a dispersion medium, available from the same company, to make a dispersoid concentration of 0.03% by mass. The measurement results are shown in Table 1 below as the "volume median particle diameter".

<Measurement of Average Degree of Circularity and Number Percentage of Particles having Particle Diameter of 1.0 μm or less>

The average degree of circularity and the number percentage of particles having a particle diameter of 1.0 μm or less were measured in such a manner that the dispersoid was dispersed in a dispersion medium (Cell Sheath, available from Malvern Panalytical, Ltd.) to make 5,720 to 7,140 particles per μL, and measured with a flow type particle image analyzer, FPIA-3000 (available from Malvern Panalytical, Ltd.) under the conditions of HPF analysis amount: 0.35 μL and HPF detection amount: 2,000 to 2,500 particles in the HPF mode.

The average degrees of circularity and the number percentages of particles having a particle diameter of 1.0 μm or less thus measured are shown in Table 1 below as the "average degree of circularity" and the "Number percentage of 1.0 μm or less".

<Mass Average Molecular Weight (Mw)>

The polymer primary particle dispersion liquid was freeze-dried to remove water, and then the tetrahydrofuran (THF) soluble component was measured by gel permeation chromatography (GPC) under the following condition.

Equipment: GPC device, HLC-8320, available from Tosoh Corporation, Columns: TOSOH TSKgel Super HM-H (diameter: 6 m×length: 150 mm×2), Solvent: THF, Column temperature: 40° C., Flow rate: 0.5 mL/min, Sample concentration: 0.1% by mass, Calibration curve: standard polystyrene <Solid Concentration of Emulsion>

The solid concentration of the emulsion was obtained by heating 2 g of a specimen at 195° C. for 90 minutes for evaporating water with an infrared moisture analyzer, FD-610, available from Kett Electric Laboratory Co., Ltd.

The wax dispersion liquids, the pigment dispersion liquid, and the polymer primary particle dispersion liquids used in Examples and Comparative Examples will be described.

<Wax Dispersion Liquid W1>

30 parts of ester wax 1 (product name: WEP-3, available from NOF Corporation, melting point: 73° C., acid value: 0.1 mgKOH/g, hydroxy value: 3 mgKOH/g or less (all catalogue values), chemical formula: $C_{21}H_{43}COOC_{22}H_{45}$) as the wax, 0.24 part of decaglycerin decabehenate (product name: BIOOD, available from Mitsubishi-Chemical Foods Corporation, hydroxy value: 27, melting point: 70° C.), 1.93 parts of a 20% sodium dodecylbenzenesulfonate aqueous solution (hereinafter abbreviated as a 20% DBS aqueous solution), and 67.83 parts of demineralized water were heated to 90° C. and mixed for 20 minutes in a CSTR type agitation tank equipped with a 45-degree tilted triple paddle blade. Subsequently, while heating the dispersion liquid to 90° C., circulation emulsification thereof was started under a pressurization condition of 25 MPa with a valve homogenizer (15-M-8PA, available from Gaulin), and the dispersion liquid was dispersed until the median diameter (D50) of particles of which diameters were measured with Nanotrac reached 245 nm, so as to produce a wax dispersion liquid W1 (emulsion solid concentration: 30.5%).

<Wax Dispersion Liquid W2>

A wax dispersion liquid W2 (emulsion solid concentration: 30.5%) was produced in the same manner as in W1 described above except that 15.0 parts of the ester wax 1, 15.0 parts of ester wax 2 (product name: WEP-5, available from NOF Corporation, melting point: 82° C., acid value:

0.1 mgKOH/g, hydroxy value: 3 mgKOH/g or less (all catalogue values), chemical formula: $C(CH_2OCOC_{21}H_{43})_4$), 1.93 parts of the 20% DBS aqueous solution, and 68.7 parts of demineralized water were used.

<Wax Dispersion Liquid W3>

A wax dispersion liquid W3 (emulsion solid concentration: 31.2%) was produced in the same manner as in W1 described above except that 30 parts of ester wax 3 (chemical formula: $C_{21}H_{43}COOC_{22}H_{45}$), 1.93 parts of the 20% DBS aqueous solution, and 68.7 parts of demineralized water were used.

<Wax Dispersion Liquid W4>

A wax dispersion liquid W4 (emulsion solid concentration: 30.3%) was produced in the same manner as in W1 described above except that 30 parts of ester wax 4 (chemical formula: $C_{40}H_{80}O_2$), 1.93 parts of the 20% DBS aqueous solution, and 68.7 parts of demineralized water were used.

<Pigment Dispersion Liquid P1>

24 parts of Pigment Blue 15:3 (cyan pigment (copper phthalocyanine complex), available from Dainichiseika Colour & Chemicals Mfg. Co., Ltd.), 1 part of the 20% DBS aqueous solution, 9 parts of a nonionic surfactant (Emulgen 120, available from Kao Corporation), and 67 parts of ion exchanged water having a conductivity of 2 μS/cm were placed in a container of an agitator equipped with a propeller blade, and preliminarily dispersed to provide a pigment premixed liquid. The premixed liquid was used as a raw material slurry and dispersed by feeding to a wet bead mill.

The stator had an inner diameter of 120 mm, the separator had a diameter of 60 mm, and zirconia beads having a diameter of 0.1 mm were used as a medium for dispersion. The stator had an effective inner capacity of approximately 2 L, and the filled volume of the medium was 1.4 L, from which the media filling rate was 70%. While retaining the rotation speed of the rotor constant (circumferential speed of rotor tip: approximately 11 m/sec), the premixed slurry was fed through the inlet port at a feeding rate of approximately 40 L/hr with a non-pulsatile metering pump, and at the time when the prescribed particle size was achieved, a pigment dispersion liquid P1 was obtained from the discharge port.

The operation was performed while circulating cooling water at approximately 10° C. in the jacket. The dispersion median diameter D50 of the pigment was 83 nm, the solid content of the dispersion liquid was 34.3%, and the pigment solid content was 24.1%.

<Polymer Primary Particle Dispersion Liquid A1>

35.3 parts of the wax dispersion liquid W1, 258 parts of demineralized water, and 0.02 part of a 0.5% iron(II) sulfate heptahydrate aqueous solution were charged in a reactor equipped with an agitation device, a heating and cooling device, a condensation device, and charging devices for the raw materials and the assistants, and heated under a nitrogen stream under agitation to make an inner temperature of 70° C.

Thereafter, under continuous agitation, a mixture of the monomers and the emulsifier solution shown below was added thereto over 300 minutes to provide a monomers and emulsifier aqueous solution. The time of the start of addition of the mixture was designated as the start of polymerization, and the initiator aqueous solution shown below was added in a dropwise manner thereto over a period of after 30 minutes to after 420 minutes from the start of polymerization. Subsequently, at the time after 300 minutes from the start of polymerization, the inner temperature was increased to 90° C. At the time after 330 minutes from the start of polymerization, the iron sulfate aqueous solution shown below was added. The heating and agitation operation was continued until after 540 minutes from the start of polymerization.

(Monomers)

| | |
|---|---|
| Styrene | 71.8 parts |
| Butyl acrylate | 28.2 parts |
| Acrylic acid | 0.95 part |
| Trichlorobromomethane | 1.0 part |
| Hexanediol diacrylate | 0.60 part |

(Emulsifier Aqueous Solution)

| | |
|---|---|
| 20% DBS aqueous solution | 1.0 part |
| Demineralized water | 66.7 parts |

(Initiator Aqueous Solution)

| | |
|---|---|
| 8% hydrogen peroxide aqueous solution | 15.5 parts |
| 8% L(+)-ascorbic acid aqueous solution | 30.1 parts |

(Iron Sulfate Aqueous Solution)

0.5% iron(II) sulfate heptahydrate aqueous solution 0.08 part

After completing the polymerization reaction, the reaction liquid was cooled to provide an opaque white polymer primary particle dispersion liquid Al. The median diameter (D50) measured with Nanotrac was 239 nm. The mass average molecular weight (Mw) of the polymer primary particles was 80,000. The Tg obtained by DSC measurement was 51.2° C.

<Polymer Primary Particle Dispersion Liquid A2>

44.1 parts of the wax dispersion liquid W2 and 252 parts of demineralized water were charged in a reactor equipped with an agitation device, a heating and cooling device, a condensation device, and charging devices for the raw materials and the assistants, and heated under a nitrogen stream under agitation to make an inner temperature of 90° C.

Under continuous agitation, a mixture of the monomers and the emulsifier solution shown below was added thereto over 300 minutes to provide a monomers and emulsifier aqueous solution. The time of the start of addition of the mixture was designated as the start of polymerization, and the initiator aqueous solution shown below was added over 420 minutes after 30 minutes from the start of polymerization. At the time after 300 minutes from the start of polymerization, the iron sulfate aqueous solution shown below was added. At the time after 330 minutes from the start of polymerization, the inner temperature was increased to 95° C. The heating and agitation operation was continued until after 540 minutes from the start of polymerization.

(Monomers)

| | |
|---|---|
| Styrene | 76.8 parts |
| Butyl acrylate | 23.2 parts |
| Acrylic acid | 1.5 parts |
| Trichlorobromomethane | 1.0 part |
| Hexanediol diacrylate | 1.0 part |

(Emulsifier Aqueous Solution)

| | |
|---|---|
| 20% DBS aqueous solution | 1.0 part |
| Demineralized water | 67.3 parts |

(Initiator Aqueous Solution)

| | |
|---|---|
| 8% hydrogen peroxide aqueous solution | 15.5 parts |
| 8% L(+)-ascorbic acid aqueous solution | 29.7 parts |

(Iron Sulfate Aqueous Solution)

0.5% iron(II) sulfate heptahydrate aqueous solution 0.05 part

After completing the polymerization reaction, the reaction liquid was cooled to provide an opaque white polymer primary particle dispersion liquid A2. The median diameter (D50) measured with Nanotrac was 238 nm. The mass average molecular weight (Mw) of the polymer primary particles was 75,000.

<Polymer Primary Particle Dispersion Liquid A3>

102.4 parts of the wax dispersion liquid W3, 283 parts of demineralized water, and 0.02 part of a 0.5% iron(II) sulfate heptahydrate aqueous solution were charged in a reactor equipped with an agitation device, a heating and cooling device, a condensation device, and charging devices for the raw materials and the assistants, and heated under a nitrogen stream under agitation to make an inner temperature of 70° C.

Thereafter, under continuous agitation, a mixture of the monomers and the emulsifier solution shown below was added thereto over 300 minutes. The time of the start of addition of the mixture was designated as the start of polymerization, and the initiator aqueous solution shown below was added in a dropwise manner thereto over a period of after 30 minutes to after 420 minutes from the start of polymerization. At the time after 300 minutes from the start of polymerization, the inner temperature was increased to 90° C. At the time after 330 minutes from the start of polymerization, the iron sulfate aqueous solution shown below was added. The heating and agitation operation was continued until after 540 minutes from the start of polymerization.

(Monomers)

| | |
|---|---|
| Styrene | 71.8 parts |
| Butyl acrylate | 28.2 parts |
| Acrylic acid | 0.95 part |
| Trichlorobromomethane | 1.0 part |
| Hexanediol diacrylate | 0.60 part |

(Emulsifier Aqueous Solution)

| | |
|---|---|
| 20% DBS aqueous solution | 1.0 part |
| Demineralized water | 66.7 parts |

(Initiator Aqueous Solution)

| | |
|---|---|
| 8% hydrogen peroxide aqueous solution | 15.5 parts |
| 8% L(+)-ascorbic acid aqueous solution | 30.1 parts |

(Iron Sulfate Aqueous Solution)

0.5% iron(II) sulfate heptahydrate aqueous solution 0.08 part

After completing the polymerization reaction, the reaction liquid was cooled to provide an opaque white polymer primary particle dispersion liquid A3. The median diameter (D50) measured with Nanotrac was 211 nm. The mass average molecular weight (Mw) was 94,345. The Tg obtained by DSC measurement was 50.7° C.

<Polymer Primary Particle Dispersion Liquid A4>

A polymer primary particle dispersion liquid A4 was obtained in the same manner as in the preparation of the polymer primary particle dispersion liquid A3 except that the wax dispersion liquid W3 was changed to the wax dispersion liquid W1.

The median diameter (D50) measured with Nanotrac was 215 nm. The mass average molecular weight (Mw) of the polymer primary particles was 84,000. The Tg obtained by DSC measurement was 50.9° C.

<Polymer Primary Particle Dispersion Liquid A5>

A polymer primary particle dispersion liquid A5 was obtained in the same manner as in the preparation of the polymer primary particle dispersion liquid A4 except that the wax dispersion liquid W1 was changed to the wax dispersion liquid W4.

The median diameter (D50) measured with Nanotrac was 195 nm. The mass average molecular weight (Mw) of the polymer primary particles was 79,000. The Tg obtained by DSC measurement was 50.5° C.

Example 1

A toner C1 was produced in the following manner.

31.2 parts (solid content) of the polymer primary particle dispersion liquid Al, 35.0 parts (solid content) of the polymer primary particle dispersion liquid A3, 0.2 part (solid content) of the 20% DBS aqueous solution, 0.10 part (solid content) of a 5% iron(II) sulfate heptahydrate aqueous solution, and 4.4 parts (solid content) of the pigment dispersion liquid P1 were added in this order under agitation to a mixer equipped with an agitation device, a heating and cooling device, and charging devices for the raw materials and the assistants.

The inner temperature was increased to 42.0° C. over 60 minutes, and then increased to 45.0° C. over 210 minutes. At this time, the volume median particle diameter (Dv50) measured with Multisizer was 4.95 μm. 22.3 parts (solid content) of the polymer primary particle dispersion liquid A2 was added over 30 minutes. After 30 minutes, 10.0 parts (solid content) of the polymer primary particle dispersion liquid A2 was further added over 10 minutes. After 30 minutes, 4.1 parts (solid content) of the 20% DBS aqueous solution and 23 parts of deionized water were added, and then the temperature was increased to 80° C. over 95 minutes, and increased to 83° C. over 60 minutes. Thereafter, the temperature was decreased to 30° C. over 30 minutes.

The resulting dispersion liquid was withdrawn and suction-filtered through No. 5C Filter Paper, available from Toyo Roshi Kaisha, Ltd., with an aspirator. The cake remaining on the filter paper was transferred to a stainless steel container equipped with an agitator (propeller blade), and after adding ion exchanged water having a conductivity of 1 μS/cm thereto, the resultant was agitated to be dispersed uniformly, followed by further agitation for 30 minutes. The procedure was repeated until the conductivity of the filtrate reached 2 μS/cm, and then the resulting cake was dried in an air dryer set to 40° C. for 48 hours, so as to provide toner base particles B1.

To the toner base particles B1 (100 parts) thus produced, 4 parts of polymer/silica composite particles (Atlas 100, available from Cabot Corporation, silica/polymer ratio: 70/30, true specific gravity: 1.7 g/cm$^3$, octahydropentalene contained), 0.5 part of titania/silica composite oxide particles (STX 50.1, available from Nippon Aerosil Co., Ltd.), and 0.4 part of small diameter silica (RY200L, available from Nippon Aerosil Co., Ltd.) were added, and the mixture was agitated and mixed with a Henschel mixer at 3,000 rpm for 15 minutes, and then sieved to provide a toner C1.

The resulting toner C1 had a volume median particle diameter of 5.41 μm and an average degree of circularity of 0.966.

Example 2

A toner C2 was produced in the same manner as in the toner C1 except that the polymer primary particle dispersion liquid Al was changed to 16.2 parts (solid content), and the polymer primary particle dispersion liquid A3 was changed to 50.0 parts (solid content) from those in Example 1.

The resulting toner C2 had a volume median particle diameter of 5.54 μm and an average degree of circularity of 0.967.

Example 3

A toner C3 was produced in the same manner as in the toner C1 except that the polymer primary particle dispersion liquid Al was changed to 31.2 parts (solid content), and the polymer primary particle dispersion liquid A5 was changed to 35.0 parts (solid content) from those in Example 1.

The resulting toner C3 had a volume median particle diameter of 5.48 μm and an average degree of circularity of 0.966.

Comparative Example 1

A toner C4 was produced in the same manner as in the toner C1 except that the polymer primary particle dispersion liquid Al was changed to 64.7 parts (solid content), and the polymer primary particle dispersion liquid A3 was changed to 0 parts (solid content) from those in Example 1.

The resulting toner C4 had a volume median particle diameter of 5.75 μm and an average degree of circularity of 0.965.

Comparative Example 2

A toner C5 was produced in the same manner as in the toner C1 except that the polymer primary particle dispersion liquid A3 used in Example 1 was changed to the polymer primary particle dispersion liquid A4.

The resulting toner C5 had a volume median particle diameter of 5.46 μm and an average degree of circularity of 0.965.

<Measurement Method of DSC>

The DSC measurement of the toner was performed in the following manner.

The equipment used was AAQ 20 and a cooling device RCS 90, available from TA Instruments, Inc.

The sample pan used was Tzero Standard, and 3.0 mg of a measurement sample was weighed.

The measurement was performed in the following manner.

After performing control to 20° C., the first heating to 120° C. at 10° C./min, retention at 120° C. for 5 minutes, cooling to 0° C. at 10° C./min, retention at 0° C. for 5 minutes, and the second heating to 120° C. at 10° C./min were performed.

The endothermic amounts in the first heating and the second heating were measured.

The endothermic amount was obtained by drawing a straight line from the base line on the high temperature side to the rising point of the endothermic peak on the low temperature side.

FIG. 1 shows the DSC curves in the first heating and the second heating of the toner obtained in Example 1. FIG. 2 shows the DSC curves in the first heating and the second heating of the toner obtained in Comparative Example 1. In all the figures, the upward direction of the ordinate shows exotherm, the downward direction of the ordinate shows endotherm, and the abscissa shows the temperature.

<Fixability Test: Printing Test and Evaluation>

An unfixed toner image having a toner attached amount of approximately 0.5 mg/cm$^2$ was printed on recording paper (OKI Excellent White, product name) with the resulting toner for development as a non-magnetic one-component developer at a printing speed of 16 ppm (paper per minute) using a commercially available printer equipped with a developing rubber roller, a metal blade, and an organic photoreceptor charged with a charging roller (PCR), from which a fixing unit had been removed.

The heat roller fixing device used had a roller diameter of 27 mm and a nip width of 9 mm, had a heater in the upper roller, and a roller surface constituted by PFA (tetrafluoroethylene-perfluoroalkyl vinyl ether copolymer), and had no silicone oil applied thereto. After setting the surface temperature of the roller to 145° C., 150° C., or 155° C., the toner image was fixed at a fixing speed of 229 mm/sec for each temperature, so as to provide an evaluation specimen.

The evaluation standard for the fixing test was as follows.

A: The fixed image was not offset, and no image defect occurred by rubbing the image.

B: The fixed image was not offset, but an image defect occurred by rubbing the image.

C: The fixed image was offset.

<Storage Stability Test>

A metal cylinder having a diameter of 2 cm was set up on a metal flat plate, and medicine paper was allowed to follow the inner wall of the cylinder. 10 g of the toner for development was gently placed and filled in the set up cylinder, and then a weight of 20 g was placed on the toner.

The metal cylinder set up on the metal plate was disposed in a thermo-hygrostat chamber at a temperature of 50° C. and a relative humidity of 55%, and retained for 48 hours. After taking the specimen out from the thermo-hygrostat chamber, the metal cylinder and the medicine paper were gently removed, the toner solidified in the cylinder shape was taken out in the set up state.

The set up toner in the solidified state was applied with a load in 10 g increments, and the load collapsing the cylinder shape was measured.

The evaluation results are shown in Table 2.

The evaluation standard therefor was as follows.

A: The cylinder shape was collapsed at a load of 80 g or less. This means that the toner is weakly solidified, and the storage stability is good.

B: The cylinder shape was not collapsed at a load of 80 g, but was collapsed at 150 g or less.

C: The cylinder shape was not collapsed at a load of 150 g. This means that the toner is strongly solidified, and the storage stability is poor.

TABLE 1

| | Toner | Volume median particle diameter (μm) | Average degree of circularity | Number percentage of 1.0 μm or less |
|---|---|---|---|---|
| Example 1 | C1 | 5.41 | 0.966 | 0.76 |
| Example 2 | C2 | 5.54 | 0.967 | 0.21 |
| Example 3 | C3 | 5.48 | 0.966 | 0.27 |
| Comparative Example 1 | C4 | 5.75 | 0.965 | 0.11 |
| Comparative Example 2 | C5 | 5.46 | 0.965 | 0.40 |

TABLE 2

| | Endothermic amount (J/g) | | | Difference in full width at half maximum | | Fixability | | | Storage stability |
|---|---|---|---|---|---|---|---|---|---|
| | First heating (HA1) | Second heating (HA2) | HA2/HA1 | (First cooling) − (first heating) | (First cooling) − (second heating) | 145° C. | 150° C. | 155° C. | |
| Example 1 | 26.73 | 22.57 | 0.84 | 1.80 | 2.04 | A | A | A | A |
| Example 2 | 31.45 | 27.55 | 0.88 | 0.91 | 1.13 | A | A | A | A |
| Example 3 | 23.21 | 19.11 | 0.82 | 3.40 | 3.50 | A | A | A | A |
| Comparative Example 1 | 19.35 | 10.63 | 0.55 | 6.45 | 7.02 | C | B | B | A |
| Comparative Example 2 | 24.79 | 18.01 | 0.73 | 3.07 | 3.28 | B | A | A | C |

(Discussion)

It was understood from the examples described above and the results of the tests having been performed by the present inventors that the present toner can retain high release force, can achieve low temperature fixing of the toner, and furthermore can exhibit good storage stability, in such a manner that the compound having the particular thermal property, for example, wax is not compatible or mixed with the other components, such as the binder resin and the pigment of the toner, but the wax exists alone, even through at least a part thereof is in a liquid state by being heated to the melting point thereof or more in fixing.

The invention claimed is:

1. A toner comprising particles containing a binder resin, a colorant, and wax, wherein the binder resin includes a polystyrene based copolymer resin or a poly(meth)acrylic based resin, the wax includes an ester based wax containing C18 and/or C22 hydrocarbon, the toner, in differential scanning calorimetry (DSC) performing a temperature program including a first heating from 40° C. to 100° C. or more at a heating rate of 10° C./min, then cooling to 40° C. or less at a cooling rate of 10° C./min, and then a second heating to 100° C. or more at a heating rate of 10° C./min, satisfies the following relationship (1), $$HA2/HA1>0.80 \quad (1),$$

in which, HA1 is a total endothemic amount in the first heating, and HA2 is a total endothermic amount in the second heating, and a difference between a full width at half maximum of an endothermic peak in the second heating and a full width at half maximum of an exothermic peak in the cooling is 7.00° C. or less.

2. The toner according to claim 1, wherein the HA2 satisfies the following relationship (3):

$$HA2\geq 19\ J/g \quad (3).$$

3. The toner according to claim 1, wherein the toner has, in the DSC, a difference between a full width at half maximum of an endothermic peak in the first heating and a full width at half maximum of an exothermic peak in the cooling of 7.0° C. or less.

4. A toner comprising particles containing a binder resin, a colorant, and wax, wherein the binder resin includes a polystyrene based copolymer resin or a poly(meth)acrylic based resin, the wax includes an ester based wax containing C18 and/or C22 hydrocarbon, and the toner, in differential scanning calorimetry (DSC) performing a temperature program including a first heating from 40° C. to 100° C. or more at a heating rate of 10° C./min, then cooling to 40° C. or less at a cooling rate of 10° C./min, and then a second heating to 100° C. or more at a heating rate of 10° C./min, satisfies the following relationships (1) and (3):

$$HA2/HA1>0.80 \quad (1)$$

$$HA2\geq 20\ J/g \quad (3),$$

in which HA1 is a total endothermic amount in the first heating, and HA2 is a total endothermic amount in the second heating.

5. The toner according to claim 4, wherein the toner has, in the DSC, a difference between a full width at half maximum of an endothermic peak in the first heating and a full width at half maximum of an exothermic peak in the cooling of 7.0° C. or less, and a difference between a full width at half maximum of an endothermic peak in the second heating and a full width at half maximum of an exothermic peak in the cooling of 7.00° C. or less.

6. The toner according to claim 1, wherein the difference between a full width at half maximum of an endothermic peak in the second heating and a full width at half maximum of an exothermic peak in the cooling is 6.0° C. or less.

7. The toner according to claim 1, wherein the HA1 satisfies the following relationship (2):

$$HA1\geq 20\ J/g \quad (2).$$

8. The toner according to claim 1, wherein the wax contains two or more of ester based waxes.

9. The toner according to claim 1, wherein a total content of the wax is 10.0 to 20.0% by mass.

10. The toner according to claim 1, wherein the ester based wax has a melting point of 70 to 80° C. and comprises an ester based low temperature fixing wax that is not compatible with the binder resin even in a molten state.

11. The toner according to claim 1, wherein the toner has a volume median particle diameter of 6.5 μm or less and includes 3.0% or less of a number percentage of particles having a particle diameter of 1.0 μm or less.

12. A toner cartridge comprising the toner according to claim 1.

13. An image formation device comprising the toner according to claim 1.

14. The toner according to claim 4, wherein the difference between a full width at half maximum of an endothermic peak in the second heating and a full width at half maximum of an exothermic peak in the cooling of 6.0° C. or less.

15. The toner according to claim 4, wherein the HA1 satisfies the following relationship (2):

$$HA1 \geq 20\ J/g \quad (2).$$

16. The toner according to claim 4, wherein the wax contains two or more of ester based waxes.

17. The toner according to claim 4, a total content of the wax is 10.0 to 20.0% by mass.

18. The toner according to claim 1 comprising toner base particles including a core layer and an external layer (shell layer), wherein the core layer contains two or more of ester based waxes.

19. The toner according to claim 1, wherein the ester based wax includes behenyl behenate, and the behenyl behenate contains a component having 22 or more carbon atoms in an amount of 60% by mass or more.

20. The toner according to claim 1 comprising toner base particles including a core layer and an external layer (shell layer), wherein the shell layer contains one or more thermoplastic resins selected from a polystyrene based resin, a poly(meth)acrylic based resin, a polyolefin based resin, an epoxy based resin, and a polyester based resin.

* * * * *